April 3, 1934.   J. B. MENTON   1,953,764
ADJUSTABLE SEAT
Filed Nov. 2, 1929   2 Sheets-Sheet 1
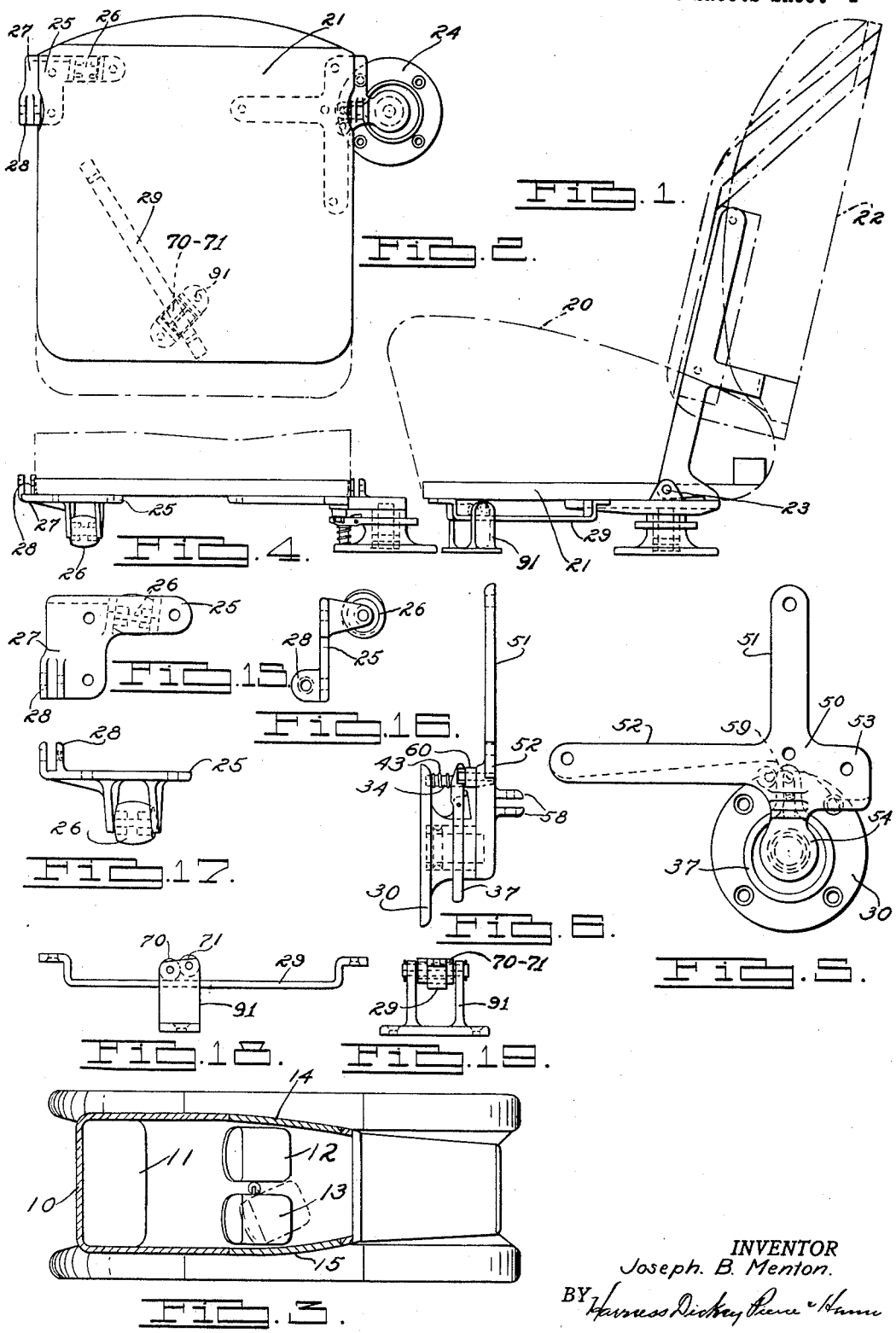
INVENTOR
Joseph. B. Menton.
BY
ATTORNEYS

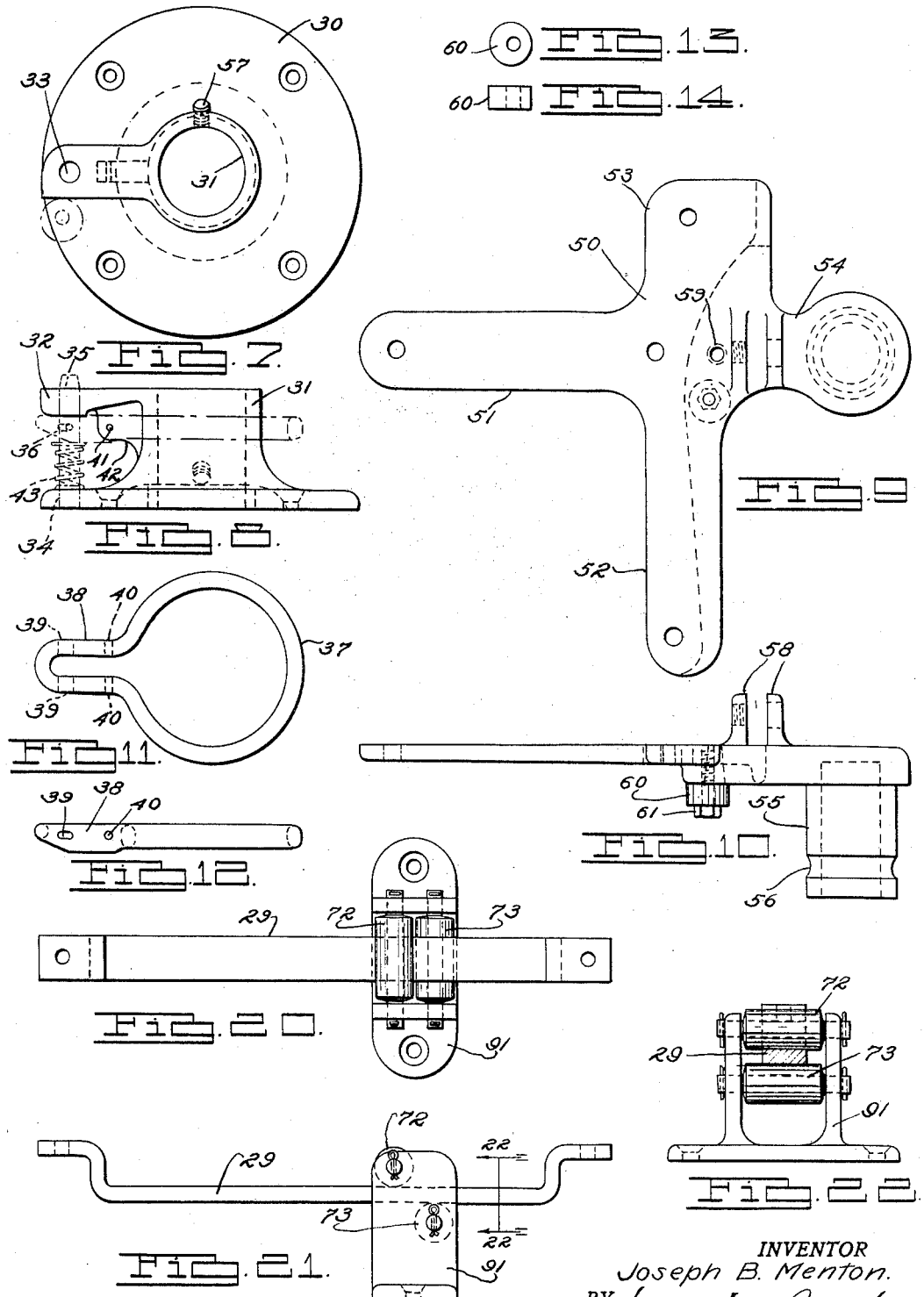

Patented Apr. 3, 1934

1,953,764

UNITED STATES PATENT OFFICE 1,953,764

ADJUSTABLE SEAT

Joseph B. Menton, Detroit, Mich., assignor to The Murray Corporation of America, a corporation of Delaware Application November 2, 1929, Serial No. 404,225

4 Claims. (Cl. 155—14)

My invention relates to seats for automobile bodies which are readily adjustable to permit the entrance and egress of persons into and from the car.

Another object of my invention is to provide a novel mounting and mechanism for an adjustable seat.

With these and other objects in view, my invention consists in the arrangement, combination and construction of the various parts of my improved device, as described in the specification, claimed in my claims, and shown in the accompanying drawings, in which:

Fig. 1 is a side elevation of a seat embodying my invention.

Fig. 2 is a plan view of the bottom of the seat shown in Fig. 1.

Fig. 3 is a plan view diagrammatically illustrating the positions of my seat in a vehicle body.

Fig. 4 is a front elevation of the means for supporting the rear portion of my seat.

Fig. 5 is a plan view of the pivotal support.

Fig. 6 is a side elevation of the pivotal support.

Fig. 7 is a plan view of the socket member of the pivotal support.

Fig. 8 is a side elevation of a socket member of the pivotal support.

Fig. 9 is a plan view of the pivoting member of the pivotal support.

Fig. 10 is a side elevation of said pivoting member.

Fig. 11 is a detail and plan of the latch operating member connected to the pivotal support.

Fig. 12 is a side elevation of said latch operating member.

Fig. 13 is a plan view of the adjustable stop member which is attached to the pivoting member of the pivotal support.

Fig. 14 is a side elevation of said stop member.

Fig. 15 is a plan view of the roller bracket which supports one rear corner of said seat.

Fig. 16 is a side elevation of said roller bracket and the roller.

Fig. 17 is a front elevation of said bracket and roller.

Fig. 18 is an elevational view of the rollers and guide member supporting the front portion of the seat.

Fig. 19 is a front elevation of said rollers and guide.

Fig. 20 is a plan view of a modified form of the roller and guide assembly for supporting the front end of the seat.

Fig. 21 is a side elevation of said modified roller and guide assembly.

Fig. 22 is a front elevation of a modified form of roller and guide assembly.

Referring to Fig. 3, the numeral 10 designates a passenger vehicle body of conventional type having a rear seat 11 and a left front seat 12 and a right front seat 13. The body is of conventional two-door sedan type in which the doors 14 and 15 are mounted in the forward portion of the body at the sides of the front seats 12 and 13 respectively. In entering and leaving the rear compartment of such a body it is necessary to squeeze around the front seat 13 or the front seat 12 to get out of either door 14 or 15. Entrance or egress is usually made through the door 15 and around the seat 13, as the seat 12 is usually the driver's seat. I have provided a right front seat 13 which may be pivoted about its inner rear corner to the position shown in the dotted lines in Fig. 3 to provide ample space for entrance to the rear seat 11 between the back of the seat 13 and the rear edge of the casing for the door 15. The back of the seat 13 is pivotally mounted relative to the seat portion proper and may be tilted forward to increase the entrance space. After the passenger has entered or left the rear compartment the seat 13 may be revolved back to its conventional position and latched against movement. This arrangement and construction makes it convenient for the person in the seat 13 to shift his position and the position of the seat to permit entrance to or egress from the rear compartment of the body without getting out of the car and without undue crowding.

Referring now to Figs. 1, 2 and 4, my seat comprises a seat cushion 20 mounted upon a base frame 21, and a pivoting seat back 22 pivotally secured to the base frame 21 as at 23. Secured to the left rear corner of the base 21 and to the floor of the car is a pivotal supporting member designated generally by the numeral 24. Secured to the right rear corner of the base 21 is a bracket 25 in which is journalled a roller 26 which contacts with the floor of the car. The bracket 25 is also provided with an extension 27 having a pair of ears 28 formed thereon between which the end supporting member for the seat back is pivotally secured. Secured to and extending diagonally across the right front portion of the seat base 21 is a guide 29 which engages a pair of rollers 70—71 journalled in a bracket 91 which is secured to the floor of the car adjacent the normal position of the front end of the seat.

Referring now to Figs. 5 and 6 and 9 to 12 inclusive, the pivotal supporting member 24 comprises a base portion 30 which is secured to the floor of the car, having a central upwardly extending socket or sleeve portion 31 which is provided with a lateral extension 32. This lateral extension 32 has a hole 33 formed therein adjacent its end and positioned perpendicular to the base flange 30. The base flange 30 immediately beneath and in alignment with the hole 33 in the bracket 32 is provided with a similar hole 34 which is preferably aligned with a hole or socket in the floor of the car. Positioned in the hole 34 and extending upwardly through the hole 33 in the lateral extension 32 is a latch pin 35 which is reciprocable in the holes 33 and 34. A cross pin 36 is secured in the latch pin 35 at a point intermediate its ends and adjacent the under side of the lateral extension 32. A handle member 37 in the form of a ring having an elongated extension 38 is positioned around the sleeve portion 31 of the socket member with the lateral extension 38 positioned on each side of the latch pin 35. Aligned apertures 39 are provided in the extension 38 through which the ends of the cross pin 36 extend. The inner portion of the extension 38 is also provided with apertures 40 through which a pin 41 may be inserted. The lateral extension 32 of the socket member 31 is provided with a downwardly extending web portion 42 which is provided with an aperture adapted to receive the pin 41, thus providing a pivotal mounting and fulcrum for the handle ring 37 on the socket member 31. A coil spring 43 is positioned around the latch pin 35 between the under side of the handle ring extension 38 and the upper side of the base flange 30 and is tensioned to force the outer end of the handle ring extension 38, and consequently the latch pin 35, upwardly. The latch pin 35 may be withdrawn through the opening 33 in the extension 32 by moving the ring portion of the handle 37 upwardly, which rocks the outer end of the lateral handle extension 38 downwardly about the pin 41.

The other part of the pivotal seat supporting means comprises a bracket member 50 comprising diversely extending arms 51, 52 and 53 which are secured to the bottom of the seat base 21 adjacent the left rear corner, as shown in Fig. 2. Extending oppositely from the arm 51 is an arm 54 which has formed on its end a depending sleeve 55 which nicely fits within the sleeves 31 of the base member 30. Around the lower end of this sleeve 55 is a groove 56. The sleeve of the base member 30 is provided with an aperture in which a set screw 57 is turned, and which may be turned so that its inner end enters the groove 56 and will prevent the removal of the sleeve 55 from the sleeve 31. Upon the upper portion of the bracket member 50 adjacent the extension 54 are a pair of ears 58 between which the end of the left standard supporting the back 22 is pivotally secured. The bracket 50 is also provided with a socket or aperture 59 adjacent the central portion thereof which enters from the under side of the bracket, and which is of a size adapted to receive the tapering end of the latch pin 35. Also secured to the under side of the bracket 50 is an adjustable stop 60 in the form of an eccentrically bored roller supported by a stud 61 turned into a threaded opening in the under side of the bracket 50. This stop is positioned to bear against the forward side of the lateral extension 32 of the base sleeve member 31 and to limit the rearward movement of the seat. The movement may be adjusted within the limits of the eccentricity of the roller 60 by loosening the stud 61 and turning the roller thereon to the desired position.

The support for the front end of the seat and the guide therefor is shown in detail in Figs. 18, 19, 20 to 22 inclusive. The first two figures show one form and the last three figures mentioned show a modified form. The guide member 29 comprises a U-shaped bracket which is secured at each end to the bottom of the seat frame 21 in a diagonal position, shown in Fig. 2. Secured to the floor of the car adjacent the forward central portion of the seat is the bracket 91 which comprises a pair of ears between which are journalled a pair of rollers 70 and 71. The roller 70 is displaced vertically relative to the roller 71 and bears upon the upper side of the bracket 29. The roller 71 is positioned to bear tightly against the bottom of the seat base 21. The rollers are arranged in this manner in order to secure a tight connection between the front portion of the seat and the floor, and to prevent rattling between the rollers and the bracket.

In the modified form shown in Figs. 20 to 22 inclusive, the guide 29 is the same as shown in Figs. 17 to 19 inclusive, and likewise the bracket 91 is the same. The rollers, however, are differently positioned. The roller 72 is journalled between the upper ends of the ears of the bracket 91 and bears upon the upper side of the guide 29, and the roller 73 is journalled in an intermediate position and bears upon the under side of the guide 29. The rollers are positioned closely enough together in the vertical direction so that each has a tight bearing against the guide 29 in order to prevent rattling.

In operation, the seat 13 is normally in the position shown in the full lines in Fig. 3. When it is desired to pivot it to permit a person to enter or leave the rear compartment of the body, the person occupying the seat grasps the handle 37, pulls upward on it which releases the latch pin 35 from the bracket 53 and permits the sleeve 55 to turn in the sleeve 31, thus permitting the seat to be pivoted to the position shown in the dotted lines in Fig. 3. The roller 26 is so positioned in the bracket 25 that it will follow the arc of a circle whose center is the center of the pivoting sleeves 31 and 55. The guide member 29 and the rollers 70—71 and 72—73 and their supporting bracket 91 are so positioned relative to the seat and floor that the guide may pass freely through the rollers during the pivoting movement of the seat. When it is desired to return the seat to normal position the person occupying it merely exerts the necessary force through his limbs and feet to swing the seat backward. The stop 60 limits its movement at a point which will permit the latch pin 35 to enter the socket 59 and thereby latch the seat in normal position. The eccentric stop 60 may be turned on its pivot to a point which will insure a tight and non-rattling engagement of the latch pin 35 in its socket 59.

Formal changes may be made in the specific embodiment of the invention described without departing from the spirit or substance of the broad invention, the scope of which is commensurate with the appended claims.

What I claim is:

1. A pivotal support for a seat comprising an upwardly extending socket member secured to a fixed support and having a laterally positioned apertured boss therein, a bracket secured to the bottom of said seat and having a depending member adapted to pivotally fit the socket member, a latch pin mounted in the boss on said socket member and reciprocable therein to engage a socket in said seat and thereby latch said seat in predetermined position, a handle member pivotally secured to said socket member and engaging said latch pin and adapted upon manipulation to reciprocate said latch pin, an adjustable stop member comprising an eccentric roll secured to said seat bracket and adapted to engage the boss on said socket member at the limit of the pivotal movement of said seat, said roll being adjustable within the limits of its eccentricity to vary the degree of the pivotal movement of the seat.

2. In combination with a seat and a fixed support therefor, a pivotal support for one rear corner of said seat, a roller secured to the opposite rear corner thereof and axially positioned to follow the arc of the circle followed by the seat when swung on said pivotal support, a diagonally disposed guide bar secured to the forward portion of said seat bottom and in spaced relation thereto, and a pair of rollers mounted on said fixed support beneath the forward portion of said seat, one of said rollers being arranged to engage the bottom of said seat and the other to engage the upper side of said guide bar, whereby the forward portion of said seat is rollingly supported relative to said fixed support and is retained against vertical movement.

3. In combination with a seat and a fixed support therefor, a pivotal support for one corner of said seat, a roller secured to an opposite corner thereof and axially positioned to follow the arc of the circle followed by the seat when swung on said pivot support, a guide bar disposed on an arc described about said support and secured to a portion of said seat bottom and in spaced relation thereto, a pair of rollers mounted on said fixed support, one of said rollers being arranged to engage the bottom of said seat and the other of said rollers to engage the upper side of said guide bar.

4. In combination with a seat and a fixed support therefor, a pivotal support for one corner of said seat, a roller secured to an opposite corner of said seat, a guide bar disposed on an arc described about said support and secured to a portion of said seat bottom having a portion in spaced relation thereto, and a pair of rollers mounted on said fixed support, one of said rollers being arranged to engage the bottom of said seat and the other of said rollers to engage the upper side of said guide bar.

JOSEPH B. MENTON.